(12) United States Patent
Xie

(10) Patent No.: US 12,384,067 B2
(45) Date of Patent: Aug. 12, 2025

(54) ROTATION CHICKEN SHREDDER

(71) Applicant: Yushan Xie, Shenzhen (CN)

(72) Inventor: Yushan Xie, Shenzhen (CN)

( * ) Notice: Subject to any disclaimer, the term of this patent is extended or adjusted under 35 U.S.C. 154(b) by 194 days.

(21) Appl. No.: 18/500,244

(22) Filed: Nov. 2, 2023

(65) Prior Publication Data

US 2025/0121524 A1    Apr. 17, 2025

(30) Foreign Application Priority Data

Oct. 17, 2023   (CN) .......................... 202322779836.3

(51) Int. Cl.
  *B26D 3/24*   (2006.01)
  *A22C 21/00*   (2006.01)

(52) U.S. Cl.
  CPC ................ *B26D 3/24* (2013.01); *A22C 21/00* (2013.01); *B26D 2210/02* (2013.01)

(58) Field of Classification Search
  CPC ....... A22C 21/00; B26D 2210/02; B26D 3/24
  See application file for complete search history.

(56) References Cited

U.S. PATENT DOCUMENTS

| | | | | |
|---|---|---|---|---|
| 2012/0181363 A1* | 7/2012 | Huang | ................... | A47J 27/004 241/100 |
| 2015/0290652 A1* | 10/2015 | Metaxatos | ......... | A22C 17/0006 241/199.12 |

FOREIGN PATENT DOCUMENTS

| | | | | |
|---|---|---|---|---|
| CN | 214159856 U | | 9/2021 | |
| GB | 2293754 A | * | 4/1996 | ............ A47J 43/255 |

* cited by examiner

*Primary Examiner* — Liang Dong
(74) *Attorney, Agent, or Firm* — JEEN IP LAW, LLC

(57) ABSTRACT

The present disclosure provides a rotation chicken shredder including a base, an upper surface of the base is provided with a buckle groove, and an outer cover is buckled inside the buckle groove. The upper surface of the base is fixed with a shield, a middle of an upper surface of the outer cover is fixed with a rotation disc, a top surface of the rotation disc is fixed with a protective shell, and an inner top surface of the protective shell is fixed with a rotation machine. This high safety rotation chicken shredder uses a repeated rotation way of clockwise rotation and counterclockwise rotation, which ensures that chicken is made into a filamentous shape in combination with an upper spike and a lower spike, improves a production effect and efficiency, has a compact and beautiful overall structure, and it is easy to promote and use.

7 Claims, 6 Drawing Sheets

ROTATION CHICKEN SHREDDER

CROSS-REFERENCE TO RELATED APPLICATIONS

This application claims priority to Chinese Patent Application No. 202322779836.3, filed on Oct. 17, 2023, which is hereby incorporated by reference in its entirety.

TECHNICAL FIELD

The present disclosure relates to the field of chicken processing devices, and in particular, to a high safety rotation chicken shredder.

BACKGROUND

Hand shredded meat, due to its unique mouthfeel and taste, has become a popular dish among people, such as hand shredded chicken. When making hand shredded chicken, it is usually manually shredded into larger and loose chunks, and then made into filamentous shapes using a chicken shredder.

As disclosed in CN202023070079.5, a shredder for chicken processing includes a shell and a base. The shell is detachably provided on the base, and there is a cavity for shredding inside the shell. The top of the shell is provided with a feeding cylinder connected to the cavity, and there are two parallel rollers for shredding in the cavity; in the above technical solution, the structure is simple, the disassembly and assembly are convenient, and it is easy to clean. The cross-section of the rod for shredding is polygonal, which is easy to shred chicken. The shredding efficiency is high, and it has promotion value; but it also has the following defects:
1) the use of the rod for shredding to process chicken can easily cause the chicken to be bits rather than filamentous;
2) the entire device is not provided with a safety device. When the upper and lower shells are not securely fastened, and the shredder has been started, which can easily cause safety hazards and affect a normal operation of the shredder.

Based on this, a high safety rotation chicken shredder is proposed to solve the above problems.

SUMMARY

In view of the shortcomings of the existing technology, the present disclosure provides a high safety rotation chicken shredder, which has the advantages of high safety and good shredding effect, and solves the problem of poor safety and shredding effect of the existing chicken shredder.

To achieve the above objectives, the present disclosure provides the following technical solution: a high safety rotation chicken shredder, including a base, where an upper surface of the base is provided with a buckle groove, and an outer cover is buckled inside the buckle groove. The upper surface of the base is fixed with a shield, a middle of an upper surface of the outer cover is fixed with a rotation disc, and a top surface of the rotation disc is fixed with a protective shell, an inner top surface of the protective shell is fixed with a rotation machine, an upper surface of the rotation disc is fixed with a drive battery to drive the rotation machine to work, a bottom of an outer surface of the rotation disk is fixed with an inner cover located on the inner side of the outer cover, and an upper surface of an inner cavity of the inner cover is fixed with multiple upper spikes, the upper surface of the base is fixed with multiple lower spikes located on an inner side of the shield; and the base, outer cover, and protective shell are provided with a safety device.

The safety device includes two electromagnetic batteries fixed at left and right ends of an inner wall of the base, left and right ends of the buckle groove are provided with a contact, left and right ends of an inner wall of the outer cover are provided with a groove corresponding to the contact, and a conductive metal member corresponding to the groove is fixed at left and right ends of the inner wall of the outer cover, left and right ends of the protective shell are both provided with a fixed slot, and an inner part of the fixed slot is fixed with an iron core, an outer surface of the iron core is wound with a coil, and a bottom end of the coil is connected to a top end of the conductive metal member, an outer surface of the rotation machine is rotationally connected to a suction rotation disc, an outer surface of the rotation machine is fixed with two contact blocks located on an inner side of the suction rotation disc.

In an embodiment of the present disclosure, a prompt light is fixed at a center of a top surface of the protective shell, which is electrically connected to the rotation machine, and the rotation machine is electrically connected to the drive battery.

In an embodiment of the present disclosure, a top surface of the protective shell is fixed with a start switch for starting an operation of the rotation machine, and a cross-section of the buckle groove is stepped.

In an embodiment of the present disclosure, the conductive metal member is one of a conductive metal rod, a conductive metal wire, or a conductive metal string.

In an embodiment of the present disclosure, the shield is located on the inner side of the outer cover, and the shield is circular in shape. The contact is a metal contact, and the contact is compatible with the groove.

In an embodiment of the present disclosure, after the coil is energized, a magnetic force is generated to attract the suction rotation disc to rotate, and the suction rotation disc contacts the contact block, and the suction rotation disc is energized to operate the rotation machine.

In an embodiment of the present disclosure, a transmission mode of the rotation disc is a repeated rotation of forward and backward, and the upper spikes and lower spikes are both ABS spikes.

Compared with the existing technology, the technical solution of the present application has the following beneficial effects.

1. This high safety rotation chicken shredder uses a repeated rotation mode of clockwise and counterclockwise rotation, which ensures that the chicken is made into a filamentous shape in combination with the upper and lower spikes, improves a production effect and efficiency, has a compact and beautiful overall structure, and it is easy to promote and use.

2. This high safety rotation chicken shredder is provided with a safety device. When the outer cover and base are not properly clamped, even if the start switch has been pressed, the rotation machine will not be powered on to work, which improves the safety of the device during use. And it can be indicated by flashing a warning light after the production is finished.

Figure 1:
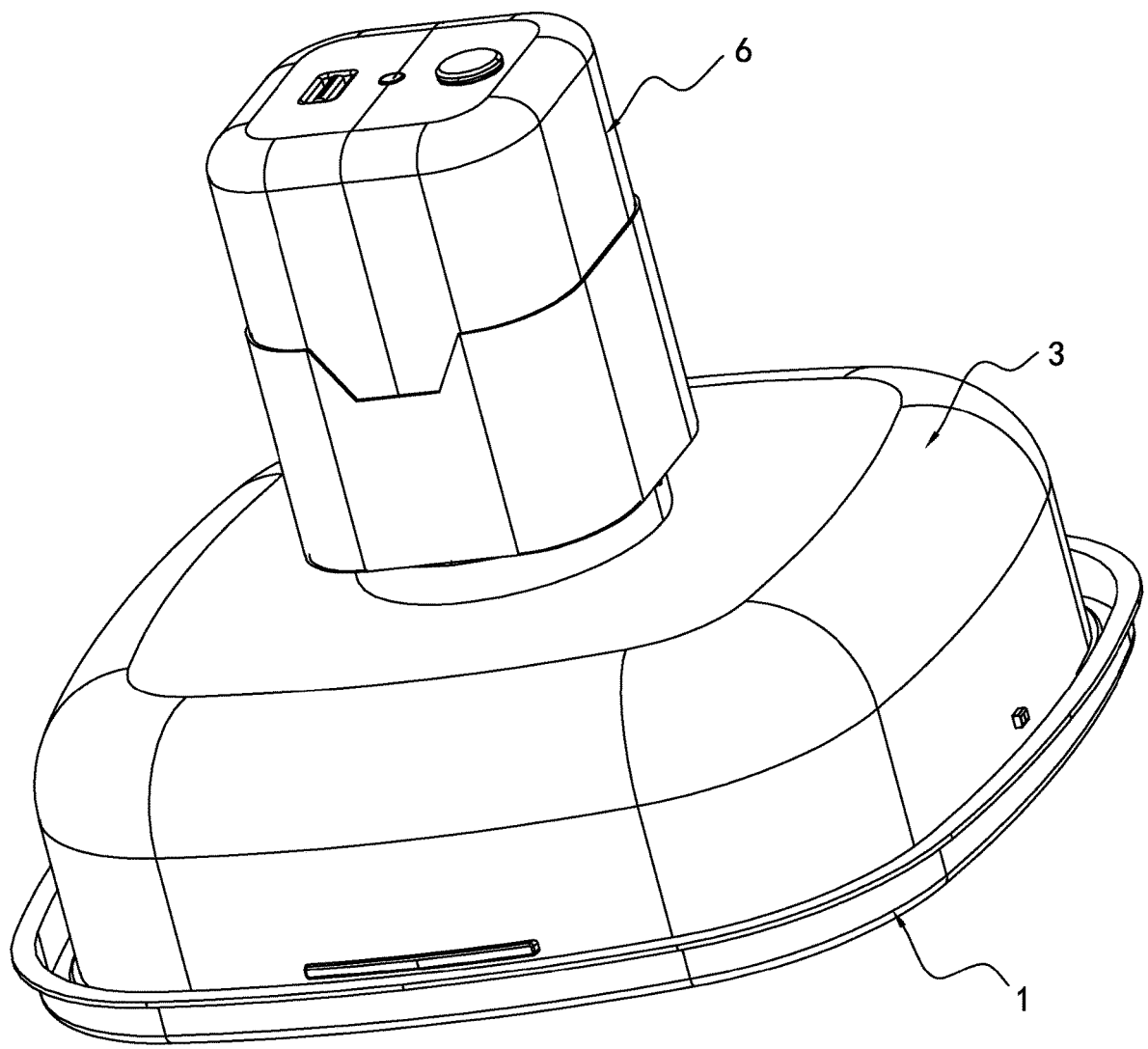
FIG. 1 is a schematic diagram of a three-dimensional structure of the present disclosure.

Reference numeral: 1—Base, 2—Buckle groove, 3—Outer cover, 4—Shield, 5—Rotation disc, 6—Protective shell, 7—Rotation machine, 8—Drive battery, 9—Inner cover, 10—Upper spike, 11—Lower spike, 12—Prompt light, 13—Start switch, 14—Electromagnetic battery, 15—Contact, 16—Groove, 17—Conductive metal member, 18—Fixed slot, 19—Iron core, 20—Coil, 21—Suction rotation disc, 22—Contact block.

DESCRIPTION OF EMBODIMENTS

The following will provide a clear and complete description of the technical solution in the embodiments of the present disclosure in combination with drawings. Obviously, the described embodiments are only a part of the embodiments of the present disclosure, not all of them. Based on the embodiments in the present disclosure, all other embodiments obtained by ordinary technical personnel in this field without creative work fall within the protection scope of the present disclosure.

Figure 2:
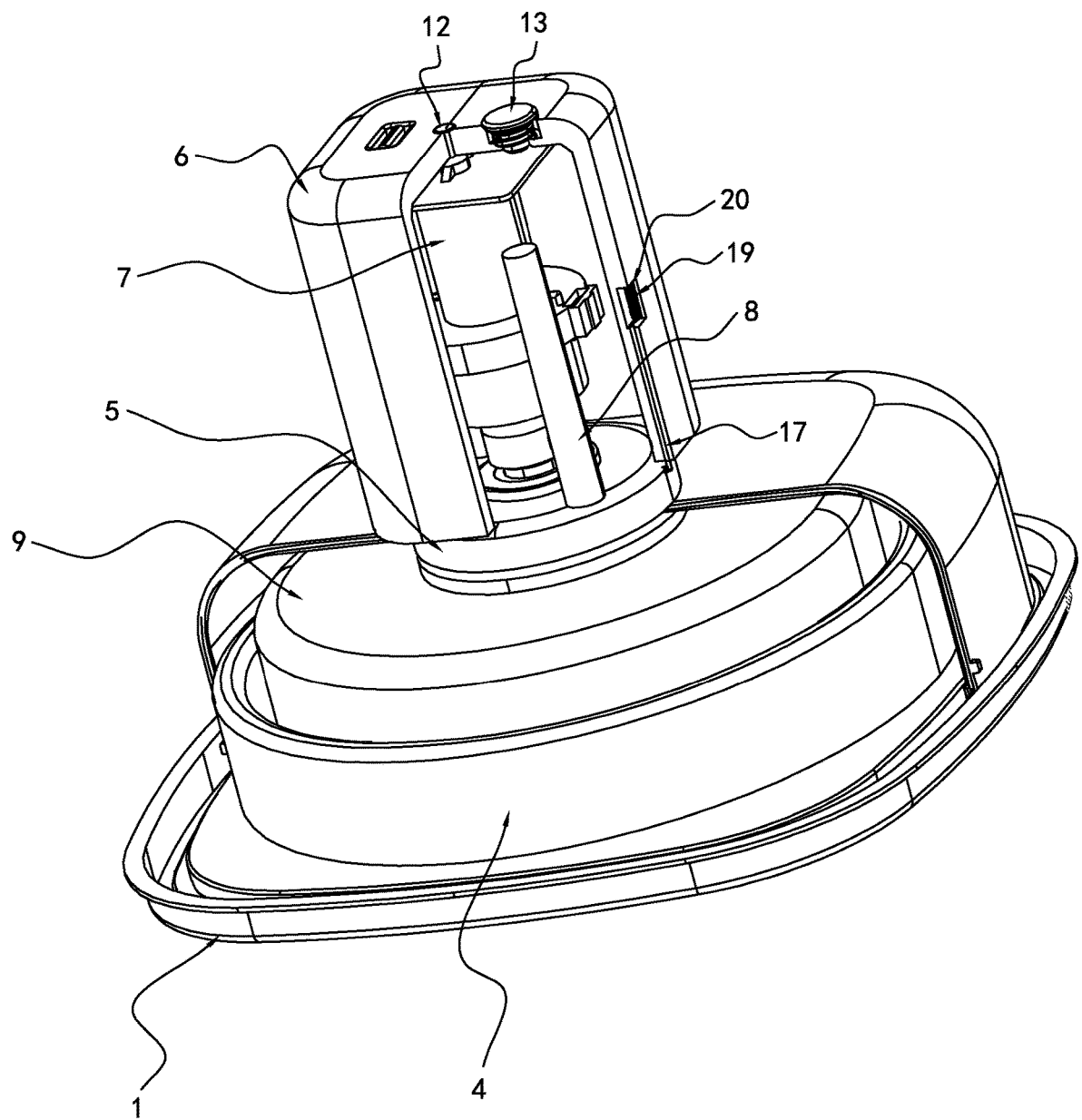
FIG. 2 is a schematic diagram of a partial cross-sectional structure of the present disclosure.
Figure 3:
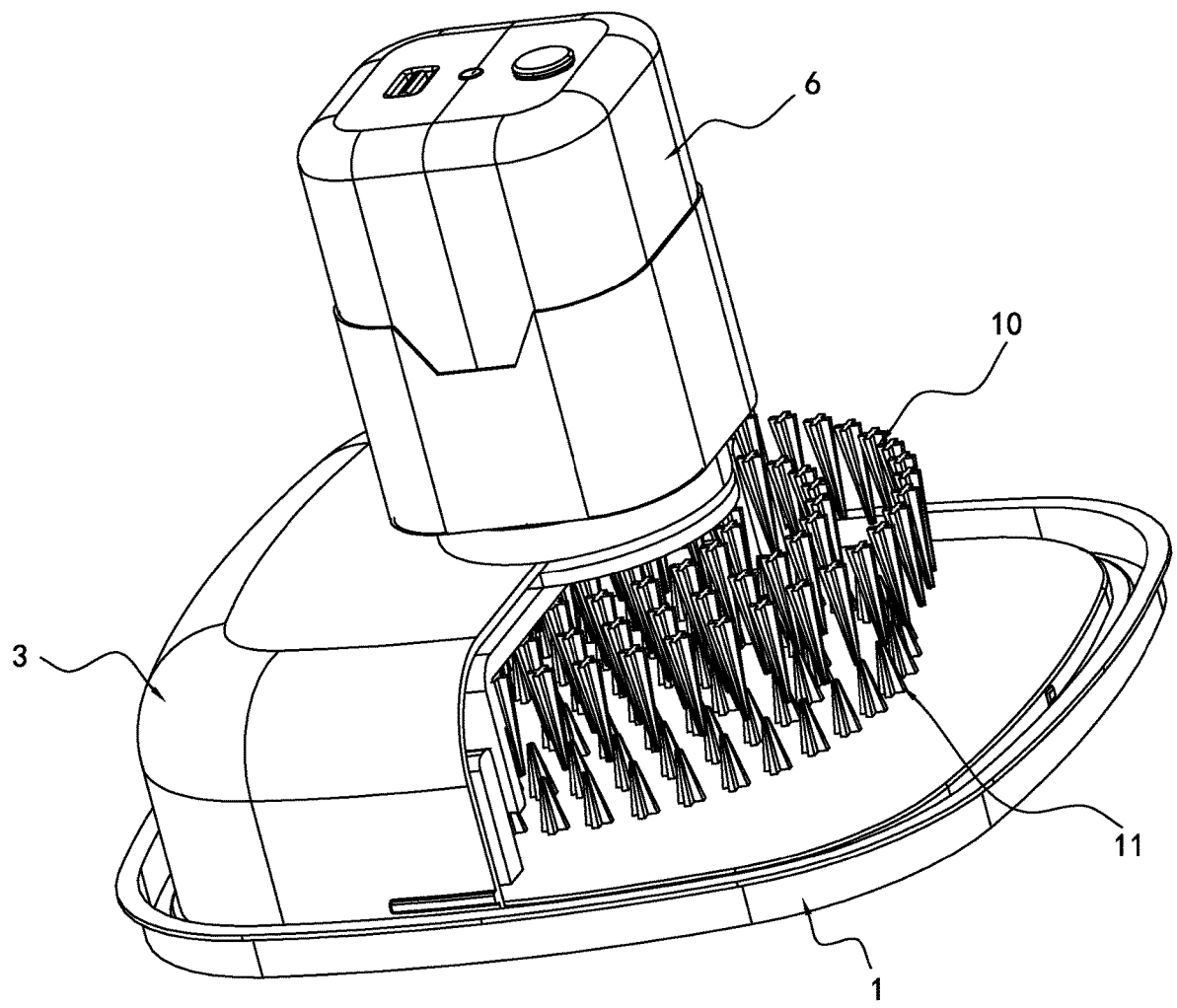
FIG. 3 is a schematic diagram of a partial cross-sectional structure of an outer cover of the present disclosure.
Figure 4:
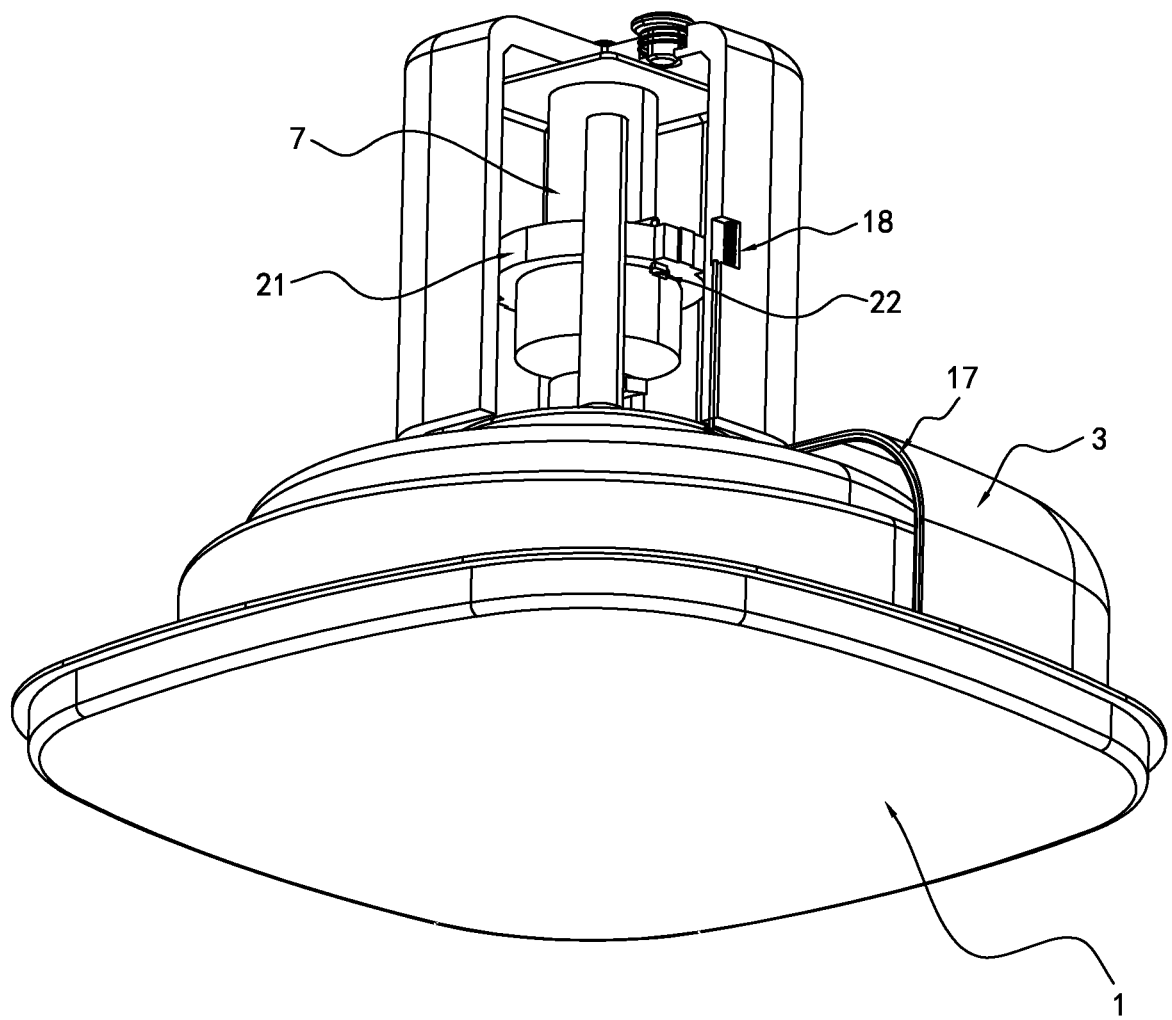
FIG. 4 is a schematic diagram of a partial cross-sectional and a top view structure of the present disclosure.
Figure 5:
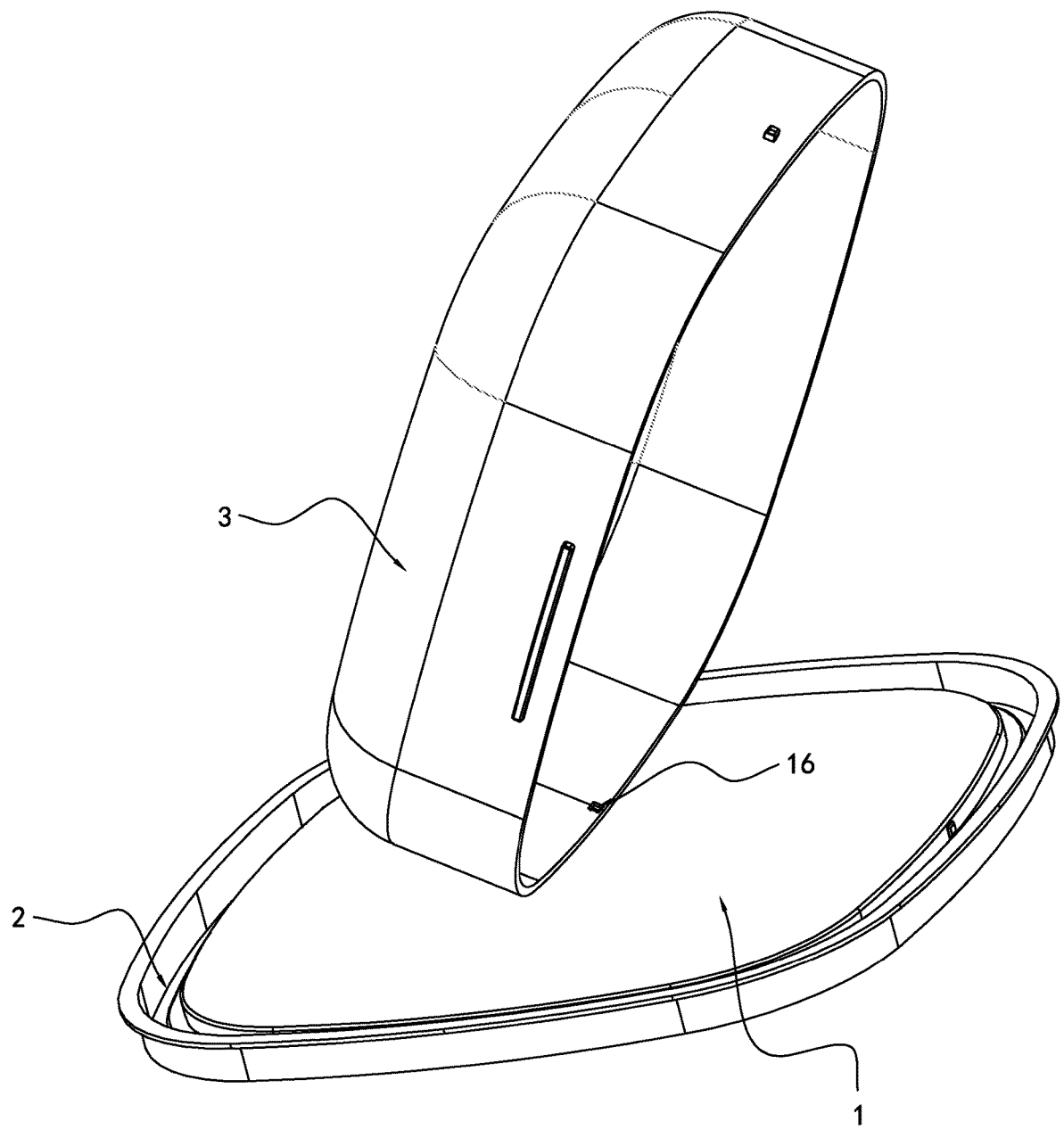
FIG. 5 is a schematic diagram of a three-dimensional structure of a connection between a base and a buckle groove of the present disclosure.
Figure 6:
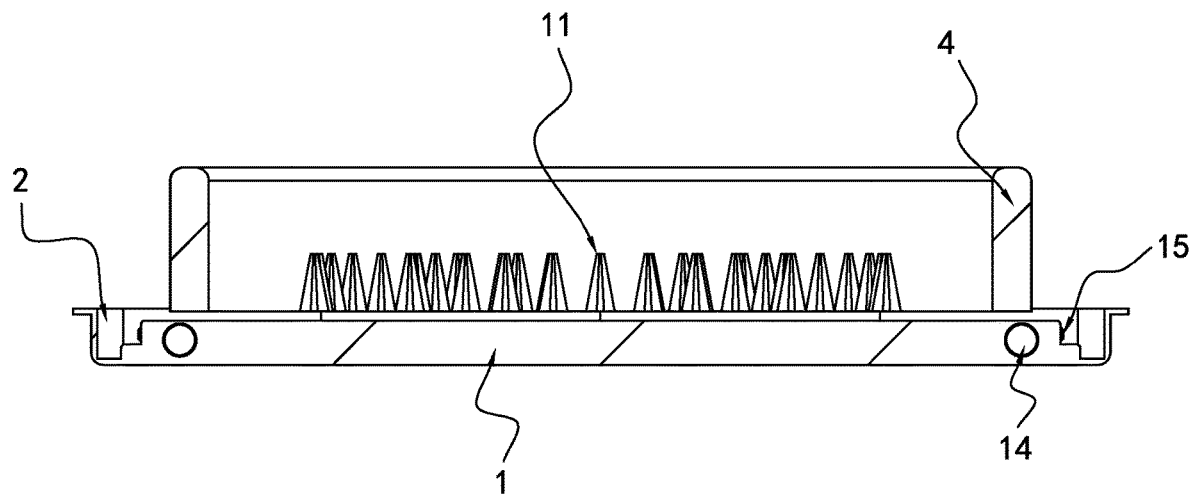
FIG. 6 is a cross-sectional structural diagram of the connection between the base and the buckle groove of the present disclosure.

Please refer to FIGS. 1-6. In this embodiment, a high safety rotation chicken shredder includes a base 1. An upper surface of the base 1 is provided with a buckle groove 2, and a cross-section of the buckle groove 2 is stepped. The buckle groove 2 is internally buckled with an outer cover 3, and the upper surface of the base 1 is fixed with a shield 4. The shield 4 is located on an inner side of the outer cover 3, and the shield 4 is circular. A middle of an upper surface of the outer cover 3 is fixed with a rotation disc 5, and a top surface of the rotation disc 5 is fixed with a protective shell 6, an inner top surface of the protective shell 6 is fixed with a rotation machine 7, and a transmission mode of the rotation machine 7 is reverse rotation. An upper surface of the protective shell 6 is fixed with a start switch 13 for starting an operation of the rotation machine 7, and the upper surface of the rotation disk 5 is fixed with a drive battery 8 for driving the rotation machine 7. A bottom of an outer surface of the rotation disk 5 is fixed with an inner cover 9 located on an inner side of the outer cover 3, and an upper surface of an inner cavity of the inner cover 9 is fixed with multiple upper spikes 10, the upper surface of base 1 is fixed with multiple lower spikes 11 located on an inner side of the shield 4. The upper spike 10 and lower spike 11 are both ABS spikes; and the base 1, cover 3, and protective casing 6 are provided with a safety device.

Among them, a prompt light 12 is fixed at a center of a top surface of the protective shell 6. The prompt light 12 is electrically connected to the rotation machine 7, and the rotation machine 7 is electrically connected to the drive battery 8. The prompt light 12 can flash after the shredded chicken is made.

In this embodiment, when the rotation machine 7 is in operation, the upper spike 10 is driven to rotate in a forward and reverse rotation manner, and in combination with the lower spike 11, the chicken can be quickly shredded into filaments.

It should be noted that the rotation machine 7 adopts an AC motor with a speed of 15000-20000 rpm; the outer cover 3 is made of ABS material, with an outer diameter of 190-195 millimeters and a height of 50-55 millimeters; the base 1 is made of ABS material, with a diameter of 230-235 mm and a height of 40-45 mm.

Please refer to FIGS. 1-6 again. In order to improve the safety when the device is in use, the safety device in this embodiment includes two electromagnetic batteries 14 fixed at left and right ends of an inner wall of the base 1; left and right ends of the buckle groove 2 are provided with a contact 15; left and right ends of an inner wall of the outer cover 3 are provided with a groove 16 corresponding to the contact 15; and a conductive metal member 17 corresponding to the groove 16 is fixed at left and right ends of the inner wall of the outer cover 3; left and right ends of the protective shell 6 are both provided with a fixed slot 18, and an inner part of the fixed slot 18 is fixed with an iron core 19; an outer surface of the iron core 19 is wound with a coil 20, and a bottom end of the coil 20 is connected to a top end of the conductive metal member 17, an outer surface of the rotation machine 7 is rotationally connected to a suction rotation disc 21, an outer surface of the rotation machine 7 is fixed with two contact blocks 22 located on an inner side of the suction rotation disc 21. After the coil 20 is energized, a magnetic force is generated to attract the suction rotation disc 21, after the suction rotation disc 21 contacts the contact block 22, it is powered on to make the rotation machine 7 work.

At the same time, the conductive metal member 17 is one of a conductive metal rod, a conductive metal wire, or a conductive metal string. The contact 15 is a metal contact, and the contact 15 is compatible with the groove 16; thus, playing a fixed role while allowing the contact 15 to come into contact with the conductive metal member 17.

In this embodiment, the safety device buckles the outer cover 3 into the buckle groove 2, and the contact 15 is in the groove 16. The electromagnet battery 14 supplies power to the coil 20 to form an electromagnet. The electromagnet generates a magnetic force to attract the suction rotation disc 21 to rotate. After the contact block 22 contacts the suction rotation disc 21, it drives the battery 8 to conduct electricity with the rotation machine 7. By pressing the start switch 13, the rotation machine 7 can be controlled to work.

It can be understood that for how to reset the suction rotation disc 21, the current flow direction in coil 20 can be reversed, and thus generating an opposite magnetic force, and then driving the suction rotation disc 21 to rotate in an opposite direction. This method is a more conventional of electromagnet technology in existing technology, so it does not need to be described in the description or in the drawings.

The working principle of the above embodiment is:
when in use, by placing the chicken on the upper surface of the base 1 and inside the shield 4, and then closing the cover 3 in the buckle groove 2, and at this time, the contact 15 engaged with the groove 16, and the contact 15 contacts the conductive metal 17, thus, a path between the electromagnetic battery 14, the conductive metal 17, and the coil 20 is formed. The current flows through the coil 20 and cooperates with the iron core 19 to form an electromagnet. The electromagnet generates a magnetic force, which drives the suction rotation disc 21 to rotate and move, which renders the suction rotation disc 21 contact the contact block 22 to conduct the drive battery 8 and the rotation machine 7. Finally, by pressing the start switch 13, the rotation machine 7 can start working. An output shaft of the rotation machine 7 drives the inner cover 9 and the upper spike 10 to rotate. The rotation method is to rotate clockwise and counterclockwise once, and in combination with the lower spike 11, the chicken can be shredded into filaments. When the rotation machine 7 reaches the working time, the rotation machine 7 stops working, and the prompt light 12 flashes to remind a user that the chicken shred has been made.

It should be noted that in this description, relational terms such as first and second are only used to distinguish one entity or operation from another entity or operation, and do not necessarily require or imply any actual relationship or order between these entities or operations. Moreover, terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by expression "including one . . . " do not exclude the existence of other identical elements in the process, method, item, or equipment that includes the said elements.

Although embodiments of the present disclosure have been shown and described, it can be understood by ordinary technical personnel in the art that multiple changes, modifications, substitutions, and variations can be made to these embodiments without departing from the principles and spirit of the present disclosure. The scope of the present disclosure is limited by the claims and their equivalents.

What is claimed is:

1. A rotation chicken shredder, comprising a base (1), wherein an upper surface of the base (1) is provided with a buckle groove (2), and the buckle groove (2) is internally buckled with an outer cover (3), the upper surface of the base (1) is fixed with a shield (4), a middle of an upper surface of the outer cover (3) is fixed with a rotation disc (5), and a top surface of the rotation disc (5) is fixed with a protective shell (6), an inner top surface of the protective shell (6) is fixed with a rotation machine (7), an upper surface of the rotation disc (5) is fixed with a drive battery (8) to drive the rotation machine (7) to work; a bottom of an outer surface of the rotation disk (5) is fixed with an inner cover (9) located on an inner side of the outer cover (3), and an upper surface of an inner cavity of the inner cover (9) is fixed with multiple upper spikes (10); the upper surface of the base (1) is fixed with multiple lower spikes (11) located on an inner side of the shield (4); and the base (1), outer cover (3), and protective shell (6) are provided with a safety device; the safety device comprises two electromagnetic batteries (14) fixed at left and right ends of an inner wall of the base (1); left and right ends of the buckle groove (2) are provided with a contact (15), left and right ends of an inner wall of the outer cover (3) are provided with a groove (16) corresponding to the contact (15), and a conductive metal member (17) corresponding to the groove (16) is fixed at left and right ends of the inner wall of the outer cover (3), left and right ends of the protective shell (6) are both provided with a fixed slot (18), and an inner part of the fixed slot (18) is fixed with an iron core (19); an outer surface of the iron core (19) is wound with a coil (20), and a bottom end of the coil (20) is connected to a top end of the conductive metal member (17), an outer surface of the rotation machine (7) is rotationally connected to a suction rotation disc (21), an outer surface of the rotation machine (7) is fixed with two contact blocks (22) located on an inner side of the suction rotation disc (21).

2. The rotation chicken shredder according to claim 1, wherein, a prompt light (12) is fixed at a center of a top surface of the protective shell (6), and the prompt light (12) is electrically connected to the rotation machine (7), and the rotation machine (7) is electrically connected to the drive battery (8).

3. The rotation chicken shredder according to claim 1, wherein a top surface of the protective shell (6) is fixed with a start switch (13) for starting an operation of the rotation machine (7), and a cross-section of the buckle groove (2) is stepped.

4. The rotation chicken shredder according to claim 1, wherein the conductive metal member (17) is one of a conductive metal rod, a conductive metal wire, or a conductive metal string.

5. The rotation chicken shredder according to claim 1, wherein the shield (4) is located on the inner side of the outer cover (3), and the shield (4) is circular in shape; wherein the contact (15) is a metal contact, and the contact (15) is compatible with the groove (16).

6. The rotation chicken shredder according to claim 1, wherein after the coil (20) is energized, a magnetic force is generated to attract the suction rotation disc (21) to rotate, the suction rotation disc (21) contacts the contact block (22), and the suction rotation disc (21) is energized to operate the rotation machine (7).

7. The rotation chicken shredder according to claim 1, wherein a transmission mode of the rotation machine (7) is a repeated rotation of forward and backward, and the upper spike (10) and lower spike (11) are both ABS spikes.

\* \* \* \* \*